United States Patent
Numakami et al.

(10) Patent No.: US 12,347,133 B2
(45) Date of Patent: Jul. 1, 2025

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventors: Yukio Numakami, Tokyo (JP); Makoto Tomioka, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 17/960,194

(22) Filed: Oct. 5, 2022

(65) Prior Publication Data

US 2023/0110992 A1 Apr. 13, 2023

(30) Foreign Application Priority Data

Oct. 12, 2021 (JP) ................... 2021-167386

(51) Int. Cl.
*G06T 7/73* (2017.01)
*G01C 21/16* (2006.01)
(Continued)

(52) U.S. Cl.
CPC ............ *G06T 7/73* (2017.01); *G01C 21/1656* (2020.08); *G01C 21/3407* (2013.01); *G05D 1/0212* (2013.01)

(58) Field of Classification Search
CPC .. G06T 7/73; G01C 21/1656; G01C 21/3407; G05D 1/0212
See application file for complete search history.

(56) References Cited

U.S. PATENT DOCUMENTS 10,694,148 B1 * 6/2020 Li ................. G01C 21/1656
10,930,007 B2 * 2/2021 Kruecker ............ A61B 8/4245
(Continued)

FOREIGN PATENT DOCUMENTS

JP 2017-224071 A 12/2017
JP 2018-017826 A 2/2018
(Continued)

OTHER PUBLICATIONS

C. Campos, R. Elvira, J. J. G. Rodríguez, J. M. M. Montiel and J. D. Tardós, "ORB-SLAM3: An Accurate Open-Source Library for Visual, Visual-Inertial, and Multimap SLAM," in IEEE Transactions on Robotics, vol. 37, No. 6, pp. 1874-1890, Dec. 2021, doi: 10.1109/TRO.2021.3075644. 2021.*

(Continued)

*Primary Examiner* — Shefali D Goradia
(74) *Attorney, Agent, or Firm* — Venable LLP (57) ABSTRACT

The information processing apparatus is provided with a measurement unit configured to perform position and orientation measurement of at least one of a position and an orientation of a moving body based on a first sensor data and a second sensor data stored in a moving body, a control content determination unit configured to determine control content of the moving body based on at least one of the position and orientation measured by the measurement unit, a dependency degree acquisition unit configured to acquire a dependency degree of the second sensor data with respect to the first sensor data, and a reliability degree calculation unit configured to calculate a reliability degree that represents a smallness of an accumulation value of the dependency degree, wherein the control content determination unit is configured to determine a control content of the moving body based on the reliability degree.

17 Claims, 8 Drawing Sheets

(51) Int. Cl.
*G01C 21/34* (2006.01)
*G05D 1/00* (2006.01)

(56) References Cited

U.S. PATENT DOCUMENTS

| | | | |
|---|---|---|---|
| 11,185,977 B2 | 11/2021 | Kobayashi et al. | |
| 11,531,344 B2* | 12/2022 | Mori | G01C 21/005 |
| 11,710,253 B2* | 7/2023 | Tazoe | G06T 7/246 |
| | | | 382/100 |
| 2014/0285794 A1* | 9/2014 | Ito | G01B 11/24 |
| | | | 356/73 |
| 2017/0356756 A1 | 12/2017 | Takatani et al. | |
| 2020/0264625 A1 | 8/2020 | Estep et al. | |

FOREIGN PATENT DOCUMENTS

| | | | | |
|---|---|---|---|---|
| JP | 2021-096731 A | 6/2021 | | |
| WO | WO-2017199325 A1 * | 11/2017 | | G06T 19/00 |
| WO | 2019/026761 A | 2/2019 | | |
| WO | WO-2019138677 A1 * | 7/2019 | | G06T 7/0002 |
| WO | WO-2023007789 A1 * | 2/2023 | | G01C 19/5776 |

OTHER PUBLICATIONS

May 27, 2025 Office Action in Japanese Patent Application Pub. No. 2021-167386 (with English translation).

* cited by examiner

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a control method of an information processing apparatus, and a storage medium, and particularly relates to the control of a moving body and peripheral equipment of a moving body.

Description of the Related Art

A technology for automatically moving a moving body such as an unmanned conveyance vehicle, for example, an automated guided vehicle (AGV), in an environment such as a factory or distribution warehouse has been proposed. In a case of automatic movement, map creation of a real space and measurement of self-position and orientation in the real space may be performed. A known method for this purpose is, for example, the Simultaneous Localization And Mapping (SLAM) method. As sensor data for position and orientation measurement, there are image data captured by a camera and laser image data measured by Light Detection and Ranging (LiDAR). Alternatively, inertial measurement data (acceleration, angular velocity, or the like) measured by an Inertial Measurement Unit (IMU) is used.

In the PCT Publication WO2019/026761, a method of stabilizing the traveling of a moving body by performing position and orientation measurement by using two types of sensor data and selecting the result of the position and orientation measurement of the second sensor data in a case in which the reliability degree of the position and orientation measurement that used the first sensor data is lowered has been proposed.

However, in the method of the PCT Publication WO2019/026761, in a case in which the reliability degree of position and orientation measurement by using the selected second sensor data decreases in accordance with time and distance, there is a problem that the moving body cannot be operated in a stable manner.

SUMMARY OF THE INVENTION

The present invention was made considering the above-described problem, and it provides an information processing apparatus capable of stably operating a moving body.

To achieve the above-described objective, the information processing apparatus of the present invention is provided with a measurement unit configured to measure at least one of a position and an orientation of the moving body based on a first sensor data and a second sensor data stored in a moving body, a control content determination unit configured to determine a control content of the moving body based on at least one of a position and an orientation measured by the measurement unit, a dependency degree acquisition unit configured to acquire a dependency degree of the second sensor data with respect to the first sensor data in a measurement by the measurement unit, and a reliability degree calculation unit configured to calculate a reliability degree that represents a smallness of an accumulation value of the dependency degree, wherein the control content determination unit is configured to determine a control content of the moving body based on the reliability degree that has been calculated by the reliability degree calculation unit.

Further features of the present invention will become apparent from the following description of exemplary embodiments (with reference to the attached drawings).

DESCRIPTION OF THE EMBODIMENTS

Hereinafter, with reference to the accompanying drawings, the embodiments of the present invention will be described. Note that the following embodiments are not intended to limit the present invention in relation to the scope of the claimed invention, and limitation is not made to the means of the solution of an invention that requires a combination of all features described in the embodiments. Note that in the following embodiments, to "improve" reliability, accuracy, and the like means that reliability, accuracy, and the like are "increased".

First Embodiment

In the present embodiment, an example in which the method of the present invention has been applied to notification control in a moving body that conveys a package will be explained. The moving body according to the present embodiment repeatedly and automatically travels along a predetermined route. During automatic traveling of the moving body, position and orientation measurement is performed by SLAM technology by using image feature points detected from image data that are captured by a camera mounted on a moving body, and acceleration and angular velocity measured by an IMU. Hereinafter, output data of the IMU will be collectively referred to as "inertial measurement data".

In general, in SLAM based on a camera image, there is a possibility that the reliability degree of position and orientation measurement may decrease due to an illuminance change, such as when lights are turned off and on, or due to a change in the arrangement of objects around the camera or the like. In that case, the degree of dependence on inertial measurement data in the position and orientation measurement increases. However, because position and orientation measurement that uses inertial measurement data, for example, performs two integrations of acceleration by unit time and estimates position by calculating the amount of displacement, errors increase as time elapses.

Therefore, in the present embodiment, the dependency degree, which is the degree of dependence on inertial measurement data in a position and orientation measurement of a moving body, is acquired. In addition, an accumulation value with respect to the dependency degree is acquired. Further, based on the dependency degree, a reliability degree that represents the smallness of error accumulation in the position and orientation measurement is calculated. Then, in a case in which the reliability degree of the position and orientation measurement has decreased, a warning notification is performed.

In the present embodiment, the moving body moves on a plane. Therefore, the position and orientation of a moving body denotes three parameters in which two parameters (X, Y) representing an arbitrary position on a two-dimensional plane and one parameter (θ) representing the orientation of the moving object are combined.

Figure 1:
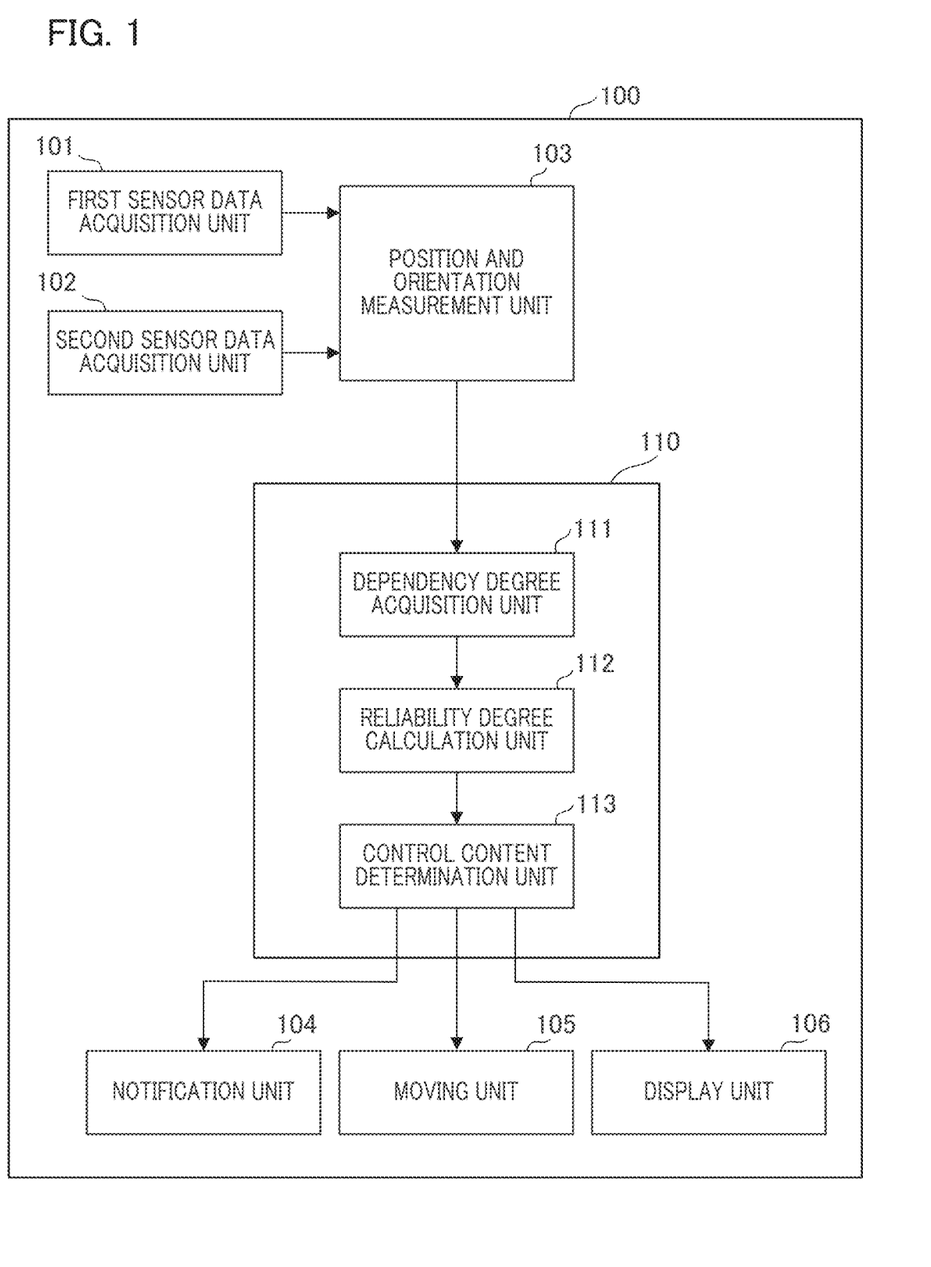
FIG. 1 is a diagram showing an example of a configuration of a moving body system provided with an information processing apparatus according to a first embodiment.

FIG. 1 is a diagram showing an example of a configuration of a moving body system provided with an information processing apparatus according to a first embodiment. The moving body system 100 is configured by a first sensor data acquisition unit 101, a second sensor data acquisition unit 102, a position and orientation measurement unit 103, a notification unit 104, a moving unit 105, a display unit 106, and an information processing apparatus 110. The moving body system 100 in the first embodiment is an example of a moving body controlled by the information processing apparatus 110, and the notification unit 104, the moving unit 105, and the display unit 106 are examples of peripheral devices of the moving body.

The information processing apparatus 110 is configured by a dependency degree acquisition unit 111, a reliability degree calculation unit 112, and a control content determination unit 113.

The first sensor data acquisition unit 101 acquires the first sensor data from the first sensor. In the present embodiment, the first sensor is a camera, and the first sensor data is image data in which a luminance value is recorded in each pixel.

The second sensor data acquisition unit 102 acquires second sensor data from the second sensor. In the present embodiment, the second sensor is an IMU, and the second sensor data is acceleration and angular velocity.

Based on the first sensor data and the second sensor data, the position and orientation measurement unit 103 measures the position and orientation of the moving body system 100. The details of position and orientation measurement will be explained below.

The notification unit 104 acquires the notification content determined by the control content determination unit 113 from the control content determination unit 113, and notifies the user. Here, the content of the notification is mainly notification content indicating the magnitude of the reliability degree, but this is not limited thereto.

The moving unit 105 acquires the moving content determined by the control content determination unit 113 from the control content determination unit 113, and controls the traveling of the moving body system 100.

The display unit 106 acquires the display content determined by the control content determination unit 113 from the control content determination unit 113, and displays the display content on a screen.

The dependency degree acquisition unit 111 acquires the degree of dependence on the second sensor data in the position and orientation measurement by the position and orientation measurement unit 103.

The reliability degree calculation unit 112 calculates the reliability degree with respect to the position and orientation measurement based on dependency degree acquired by the dependency degree acquisition unit 111.

In the present embodiment, the control content determination unit 113 determines control content, such as notification content related to the moving body system 100. Specifically, it determines the notification content of the notification unit 104, the moving content of the moving unit 105, and the display content of the display unit 106. In addition, as the moving content of the moving unit 105 in the present embodiment, the control content determination unit 113 determines at least one of the progression of the moving body, the speed of the moving body, the orientation of the moving body, and the route of the moving body. In addition, as the display content of the display unit 106, the control content determination unit 113 determines a display content capable of identifying the magnitude of the reliability degree. Note that the control content of the control content determination unit 113 is not limited thereto.

Figure 2:
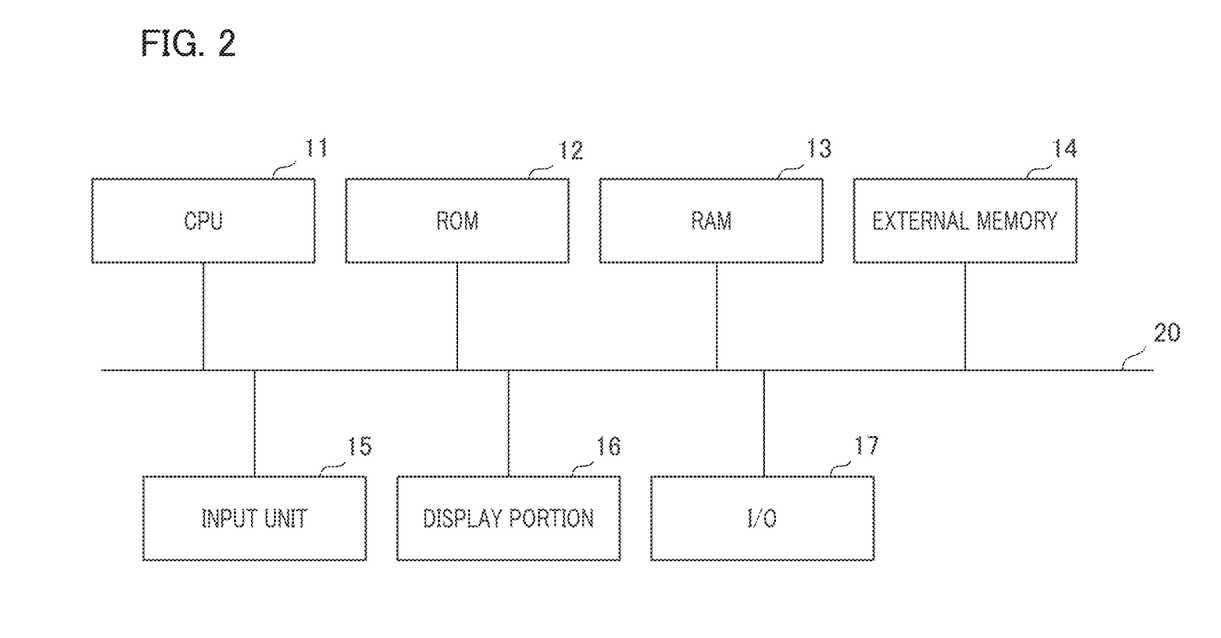
FIG. 2 is a diagram showing the hardware configuration of the information processing apparatus according to the first embodiment.

FIG. 2 is a diagram showing the hardware configuration of the information processing apparatus 110 according to the first embodiment. A CPU 11 performs control of the various devices connected to a system bus 20. A ROM 12 stores a BIOS program and a boot program. A RAM 13 is used as a main storage device of the CPU 11. An external memory 14 stores programs to be processed by the information processing apparatus 110. An input unit 15 is a keyboard, a mouse, or a robot controller, and performs processing related to the input of information or the like. A display portion 16 outputs a calculation result of the information processing apparatus 110 to a display device in accordance with an instruction from the CPU 11. Note that the display device may be of any type, such as a liquid crystal display device, a projector, or a light emitting diode (LED) indicator and the like. Further, an I/O 17 is connected to the system bus 20.

Figure 3:
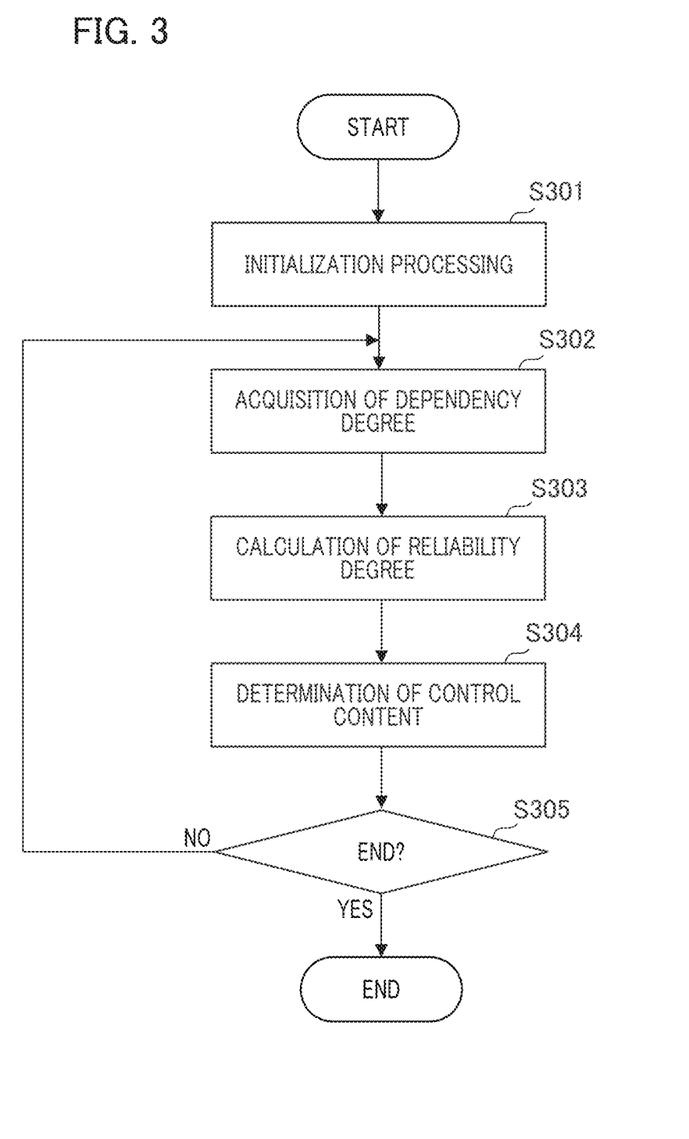
FIG. 3 is a flowchart showing a processing procedure of the information processing apparatus according to the first embodiment.

FIG. 3 is a flowchart showing a processing procedure of the information processing apparatus according to the first embodiment.

In step S301, the information processing apparatus 110 is initialized. Specifically, a threshold value related to the degree of dependence to be used when calculating the reliability degree in the reliability degree calculation unit 112 is read. In addition, the setting of a list or the like in which a plurality of pairs of reliability degree and control content to be used when determining the control content in the control content determination unit 113 are enumerated is read.

In step S302, the dependency degree acquisition unit 111 acquires the dependency degree on the second sensor data in the position and orientation measurement at a certain temporary point from the position and orientation measurement unit 103. The dependency degree is a value that indicates the degree of dependence on the position and orientation measurement by using inertial measurement data in the position and orientation measurement performed by the position and orientation measurement unit 103. The details of a dependency degree to be acquired will be explained below.

In step S303, the reliability degree calculation unit 112 calculates a reliability degree based on the dependency degree acquired in step S302. The reliability degree is a value that shows how small the error accumulation is in the measurement result by the position and orientation measurement unit 103. The details on the method for calculating the reliability degree will be explained below.

In step s304, based on the reliability degree calculated in step s303, the control content determination unit 113 refers to the above described list configured by the pairs of reliability degree and control content, and determines the control content with respect to the moving body system 100. In the present embodiment, the control content determination unit 113 refers to the above-described list and, in a case in which the calculated reliability degree has become lower than a predetermined value, determines that notification will be provided using a warning message indicating that the reliability degree of the position and orientation measurement is decreasing.

In step S305, whether or not to terminate the entire processing of the information processing apparatus 110 is determined. Specifically, it ends in a case in which the moving body system 100 reaches its destination and terminates automatic traveling. Otherwise, the processing returns to step S302 and continues.

In the present embodiment, the position and orientation measurement unit 103 performs position and orientation measurement by using image data and inertial measurement data. Here, the image data is the first sensor data captured by a camera that is the first sensor. Further, inertial measurement data is the second sensor data that is measured by an IMU, which is the second sensor.

Using the image data and the inertial measurement data, the ORB-SLAM3 method is used in the present embodiment as a method of position and orientation measurement with respect thereto. Specifically, the following method was presented by Carlos Campo et. al, at Cornell University. That is, according to the method presented in ORB-SLAM3: *An Accurate Open-Source Library for Visual, Visual-Inertial and Multi-Map SLAM.*

In this method, matching is performed with an image feature detected from image data captured by the camera from among a plurality of image features stored as a position and orientation measurement map. Next, the position and orientation in which the sum (residual) of the difference between the position and orientation calculated by combining an image feature position and inertial measurement data is smallest is measured. At this time, the number of image feature points detected from the image data is calculated as the degree of dependence on the inertial measurement data.

The position and orientation measurement map is a set of the captured image data, the position and orientation of the camera at the time of capture, an image feature point detected from the image data, and a three-dimensional position of the image feature point. The image feature information is a feature point of an image feature, and a two-dimensional coordinate on an image. An image feature is detected as a feature point that indicates a geometric structure such as a corner in an image. One set of image data, position and orientation at the time of image capture, an image feature point detected from the captured image, and the 3D position of the feature is referred to as a "keyframe".

Note that, in the present embodiment, the position and orientation measurement map is created by the position and orientation measurement unit 103 before the moving body system 100 starts automatic traveling. In addition, the position and orientation measurement map is held by the position and orientation measurement unit 103.

In addition, in the present embodiment, the camera, which is the first sensor, is fixed to the moving body system 100. Because the camera moves and rotates in association with the movement and rotation of the moving body system 100, the position and orientation of the moving body system 100 is associated with the position and orientation of the camera. Because the captured image data is dependent on the position and orientation of the camera, a change in the position or orientation of the moving body system 100 will affect the result of the position and orientation measurement that uses image data.

Further, in the present embodiment, during the automatic traveling of the moving body system 100, the first sensor data acquisition unit 101 repeatedly acquires image data at a predetermined time interval. The second sensor data acquisition unit 102 repeatedly acquires inertial measurement data at a predetermined time interval. The position and orientation measurement unit 103 repeatedly performs position and orientation measurement at a predetermined interval (for example, each keyframe held as a position and orientation measurement map) by using the latest image data and inertial measurement data acquired at that point in time.

In the present embodiment, the height of a degree of dependence on the second sensor data acquired from the position and orientation measurement unit 103 by the dependency degree acquisition unit 111 is calculated based on the smallness of the number of image feature points. Specifically, during the automatic traveling of the moving body system 100, the number of image feature points detected from the image data acquired at that point in time in the position and orientation measurement at a certain temporary point in time by the position and orientation measurement unit 103. Then, the degree of dependence is calculated such that the greater the number of image feature points, the lower the dependency degree, and the fewer the number of image feature points, the higher the dependency degree becomes. The reason for this is that the accuracy of the position and orientation measurement with respect to the image data depends on the position and orientation of the moving body at the time at which the image data is measured. Specifically, this is because the accuracy of the position and orientation measurement that uses the image data depends on the number of image feature points, and the fewer the number of image feature points, the lower the accuracy of the position and orientation measurement that uses the image data, and as a result depends on the position and orientation measurement that uses inertial measurement data.

In the present embodiment, the reliability degree calculated by the reliability degree calculation unit 112 is calculated so as to lower the reliability degree as the time that the state in which the dependency degree acquired by the dependency degree acquisition unit 111 remains above a predetermined threshold becomes greater. Specifically, the lowest value of the reliability degree is set to 0.0, the highest value of the reliability degree is set to 1.0, and the initial value of the reliability degree is set to 1.0. Starting from the time at which the dependency degree exceeds the predetermined threshold, for the duration of that state, the reliability degree is reduced by 0.1 for each predetermined time interval that elapses. In a case in which the dependency degree falls below the predetermined threshold for two consecutive times during the predetermined time interval, the reliability degree is returned to the initial value of 1.0.

According to the method of the first embodiment, in a case in which the reliability degree of the position and orientation measurement has decreased, the information processing apparatus is controlled so as to issue a warning notification to the user before the moving body system 100 cannot be stably operated. Thereby, the moving body can be stably operated as a result.

In the present embodiment, the degree of dependence on the second sensor data is calculated by using the number of image feature points detected from the image data, but this is not limited thereto, and the spatial deviation of the image feature points may also be used. As a method for calculating the dependency degree, in a case in which the image feature points are spatially widely distributed, because the accuracy of position and orientation measurement that uses the image data becomes high, the dependency degree is calculated so as to become low. In contrast, in a case in which the image feature points are distributed in a spatially biased manner, because the accuracy of position and orientation measurement that uses the image data becomes low, the dependency degree is calculated so as to become high.

In addition, provided that the set values from the position and orientation measurement unit 103 used during position and orientation measurement or the calculation results during the process can be acquired, this is not limited thereto. For example, a residual with respect to the image data calculated at the time of bundle adjustment of the position and orientation measurement may be used. As a method for calculating the dependency degree, in a case in which a residual related to the image data is small, because the accuracy of the position and orientation measurement that uses the image data becomes high, the dependency degree is calculated so as to become low. In contrast, in a case in which a residual with respect to the image data is large, because the accuracy of the position and orientation measurement that uses the image data becomes low, the dependency degree is calculated so as to become high.

In addition, in the position and orientation measurement by the ORB-SLAM3 method used in the present embodiment, the dependency degree may also be calculated by using a setting value for adjusting the ratio occupied by the image data and the ratio occupied by inertial measurement data. As a method for calculating the dependency degree, the degree of dependence is calculated so that the larger the setting value indicating the percentage occupied by inertial measurement data, the higher the dependency level, and the smaller the setting value, the lower the dependency level.

In addition, the result of bias correction with respect to inertial measurement data calculated at the time of position and orientation measurement may also be used. Due to the characteristics of an IMU, the inertial measurement data measured by the IMU includes a bias component, and in the position and orientation measurement of the ORB-SLAM3 method used in the present embodiment, a process that corrects this bias is performed. However, because the difference in the correction value increases as the accuracy of position and orientation measurement that uses image data decreases, the greater the difference in the correction value, the higher the calculated degree of dependence on the inertial measurement data, which is the second sensor data.

In the present embodiment, the reliability degree calculation unit 112 calculates the reliability degree so that the larger the accumulated value of a dependency degree becomes, the lower the reliability degree becomes. For example, the reliability degree calculation unit 112 calculates the reliability degree so that the reliability degree becomes lower as the time in which the dependency degree is in a state in which it continues to exceed a predetermined threshold value becomes greater. However, this is not limited thereto. That is, if the error accumulation that is the accumulation value of dependency degree can be calculated, another method may also be used. For example, the reliability degree calculation unit 112 may calculate so that the reliability degree becomes lower as the sum of the dependency degree becomes greater. Specifically, the sum of the dependency degree is calculated starting at the point at which the dependency degree exceeds a predetermined threshold, and the reliability degree is reduced by a certain ratio according to the magnitude of the sum.

Further, the reliability degree calculation unit 112 may calculate the reliability degree so that as the larger the distance traveled in a state in which the dependency degree exceeds a predetermined threshold becomes, the lower the reliability degree becomes. Specifically, the position and orientation measurement unit 103 holds a key frame at each predetermined distance, and sets the initial value of the reliability degree to 1.0. Then, starting from the position at which the dependency degree exceeds the predetermined threshold, for the duration of that state, the reliability degree is reduced by 0.1 for each keyframe referenced by the position and orientation measurement unit 103. In a case in which the dependency degree falls below the predetermined threshold in successive key frames, the reliability degree is returned to 1.0.

In addition, as described above, the reliability degree calculation unit 112 reduces the reliability degree by a certain ratio according to the accumulation value of the dependency degree, the lapse of time, and the traveling distance. However, this is not limited thereto, and for example, the reliability degree may be reduced exponentially. Further, the reliability degree may be calculated so as to be the reciprocal of the accumulation value of the dependency degree.

In addition, although the reliability degree calculation unit 112 reduces the reliability degree by a predetermined ratio starting at the time point at which the dependency degree exceeds a predetermined threshold value, it may calculate the reliability degree so as to reduce the reliability degree as appropriate according to the magnitude of the dependency degree value, without setting a predetermined threshold value.

In the present embodiment, in a case in which the reliability degree has become lower than a predetermined value, the control content determination unit 113 determines to notify a warning message indicating that the reliability degree of the position and orientation measurement is decreasing, but this is not limited thereto. Another notification method may be used if a means is provided to notify the user of the decrease of the reliability degree, for example, by sounding a warning sound or by determining to output to an external device.

Further, if the control content determination unit 113 is capable of holding the determined control content, from the next time and thereafter, when the reliability degree becomes higher than a predetermined value, it may determine to notify the user that the reliability degree has recovered. For example, in a case in which the reliability degree has become higher than a predetermined value, a decision may be made to notify the user with a message to the effect that that the reliability degree of the position and orientation measurement is improving. Similarly, in a case in which the reliability degree has become higher than a predetermined value, the control content determination unit 113 may determine that the warning sound is to be stopped.

In the present embodiment, the first sensor is a camera and the first sensor data is image data, but this is not limited thereto. For example, the first sensor may be a LiDAR, and the first sensor data may be 2D or 3D point group data measured by LiDAR.

Similarly, in the present embodiment, the second sensor is an IMU and the second sensor data is inertial measurement data, but this is not limited thereto. That is, in a case in which the moving body system 100 is provided with a wheel, for example, the second sensor is a rotary encoder that measures the rotation of the wheel, and the second sensor data may be the angle of rotation of the wheel as measured by the rotary encoder. In addition, in the present embodiment, an inertial measurement data that summarizes acceleration and angular velocity is used as the second sensor data, but this is not limited thereto. Only the acceleration or only the angular velocity may be used as the second sensor data.

As a method for position and orientation measurement that uses two types of sensor data, loosely coupled (loose coupling) and tightly coupled (tight coupling) methods are available. The loosely coupled method integrates the results of each position and orientation measurement, whereas the tightly coupled method integrates two types of sensor data to perform position and orientation measurement. In the present embodiment, the position and orientation measurement unit 103 uses a tightly coupled method for position and orientation measurement, but this is not limited thereto and a loosely coupled method may be used. For example, the position and orientation measurement unit 103 performs each of the position and orientation measurement that uses the image data and the position and orientation measurement that uses the inertial measurement data, and corrects the results of position and orientation measurement that uses image data with the results of position and orientation measurement that uses inertial measurement data.

Modification Example 1-1

A modification of the first embodiment will be explained. In the present modification example, an example in which the method of the present invention is applied to movement control of a moving body will be explained. Specifically, when the reliability degree of position and orientation measurement has decreased, the moving body decelerates or stops.

In the present modification example, when the control content determination unit 113 determines the control content, it uses a list of a plurality of enumerated pairs of reliability degree and control content. The list describes the control content for decelerating traveling with respect to a first value of the reliability degree, and the control content for stopping traveling with respect to a second value of the reliability degree.

In the present modification example, changes from the flowchart of FIG. 3, which shows the processing procedures of the information processing apparatus 110 that was explained in the first embodiment, will be explained. In step s304, the control content determination unit 113 refers to the list described above. Then, in a case in which the reliability degree calculated by the reliability degree calculation unit 112 has become lower than the first value, it is determined to decelerate the traveling of the moving body system 100. In contrast, in a case in which the reliability degree has become lower than the second value, the control content determination unit 113 determines to stop the traveling of the moving body system 100. In addition, in a case in which the reliability degree, which had become lower than the second value, has become higher than the second value, the control content determination unit 113 determines that the traveling of the stopped moving body system 100 is started again. Similarly, in a case in which the reliability degree, which had become lower than the first value, has become higher than the first value, the control content determination unit 113 determines to recover the speed of the moving body system 100 that had been decelerated.

The moving unit 105 controls the travelling of the moving body system 100 in accordance with the control content determined by the control content determination unit 113.

In the present modification example, the control content determination unit 113 determines that the traveling of the moving body system 100 is to be decelerated or stopped based on the reliability degree, but this is not limited thereto. If the moving body system 100 is able to secure a sufficient width of a traveling route, for example, the orientation of the moving body system 100 may be changed. Specifically, in a case in which the reliability degree has become lower than a predetermined value, the control content determination unit 113 determines that the orientation of the moving body system 100 is to be rotated at a predetermined angle. Accordingly, the moving unit 105 changes the orientation of the moving body system 100. The above processing is repeated until the reliability degree becomes higher than a predetermined value.

Second Embodiment

In the present embodiment, an example in which the method of the present invention is applied to movement control of a moving body that conveys a package will be explained. In the modification example 1-1, it was shown that, when the reliability degree of the position and orientation measurement has decreased, by determining to decelerate or stop the moving body, the moving body can be stably operated.

In the present embodiment, a reliability degree distribution that pairs position and orientation and reliability degree of the moving body is held, and when the reliability degree of the position and orientation measurement has decreased, the reliability degree in the vicinity of the current position of the moving body is searched, and the orientation of the moving body is changed towards a direction in which the reliability degree becomes higher. Thereby, a method of improving the reliability degree of position and orientation measurement will be described.

Figure 4:
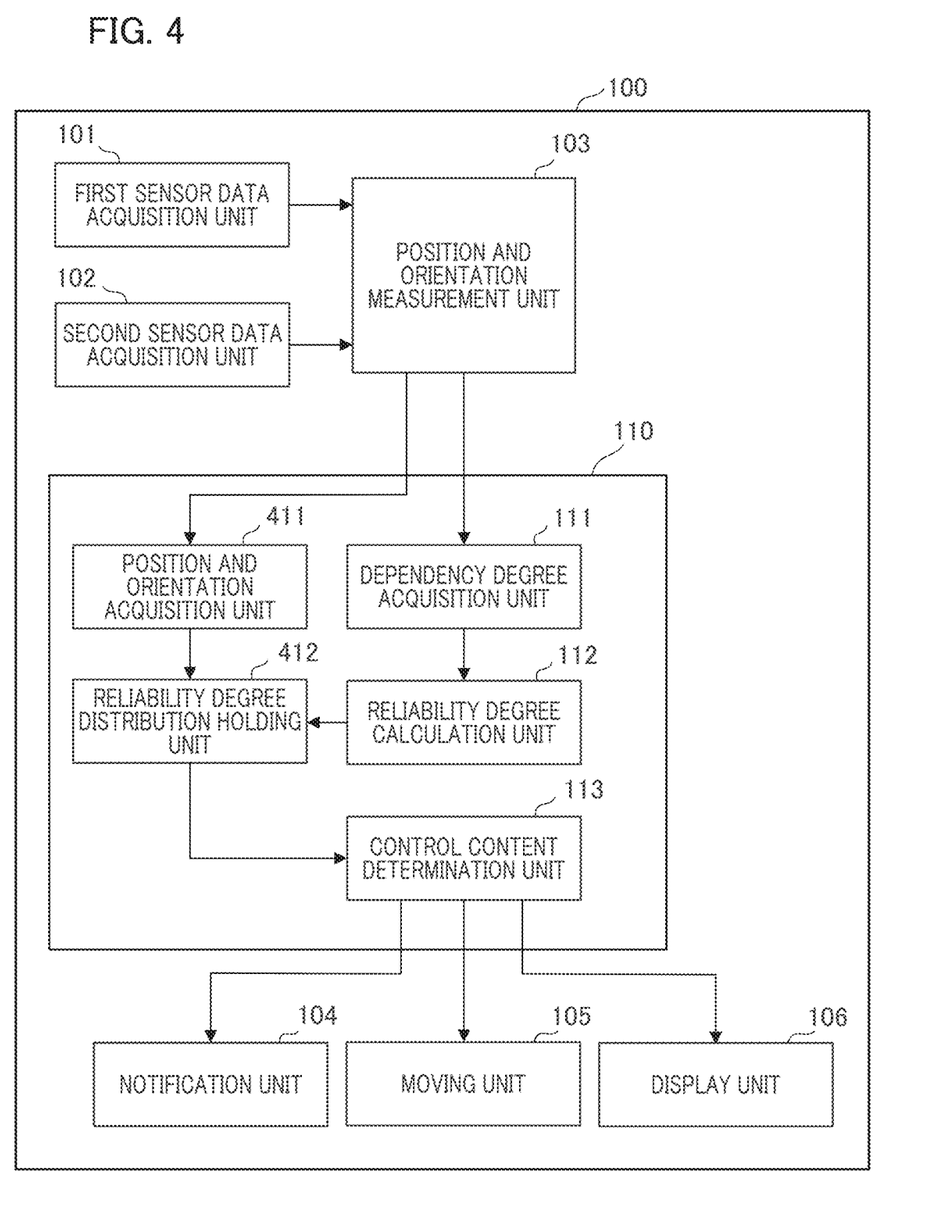
FIG. 4 is a diagram showing an example of a configuration of a moving body system provided with an information processing apparatus according to a second embodiment.

FIG. 4 is a diagram showing an example of a configuration of a moving body system provided with an information processing apparatus 110 according to the second embodiment. An explanation with respect to the same module as that explained in FIG. 1 showing a configuration example of a moving body system provided with an information processing apparatus that was explained in the first embodiment will be omitted, and only modules that differ from the first embodiment will be explained.

In the present embodiment, the information processing apparatus 110 is configured by the dependency degree acquisition unit 111, the reliability degree calculation unit 112, the control content determination unit 113, a position and orientation acquisition unit 411, and a reliability degree distribution holding unit 412.

The position and orientation acquisition unit 411 acquires the results of a position and orientation measurement from the position and orientation measurement unit 103.

The reliability degree distribution holding unit 412 holds a list configured from a pair of the position and orientation acquired by the position and orientation measurement unit 103, and the reliability degree calculated by the reliability degree calculation unit 112 based on the dependency degree corresponding to the position and orientation. Hereinafter, the list that is configured from pairs in which the position and orientation of a moving body are associated with a reliability degree is referred to as a "reliability degree distribution list".

The control content determination unit 113 determines the control content with respect to the moving body system 100 based on the reliability degree distribution list held by the reliability degree distribution holding unit 412. In the present embodiment, the control content determination unit 113 determines the moving content with respect to the moving body system 100.

Figure 5:
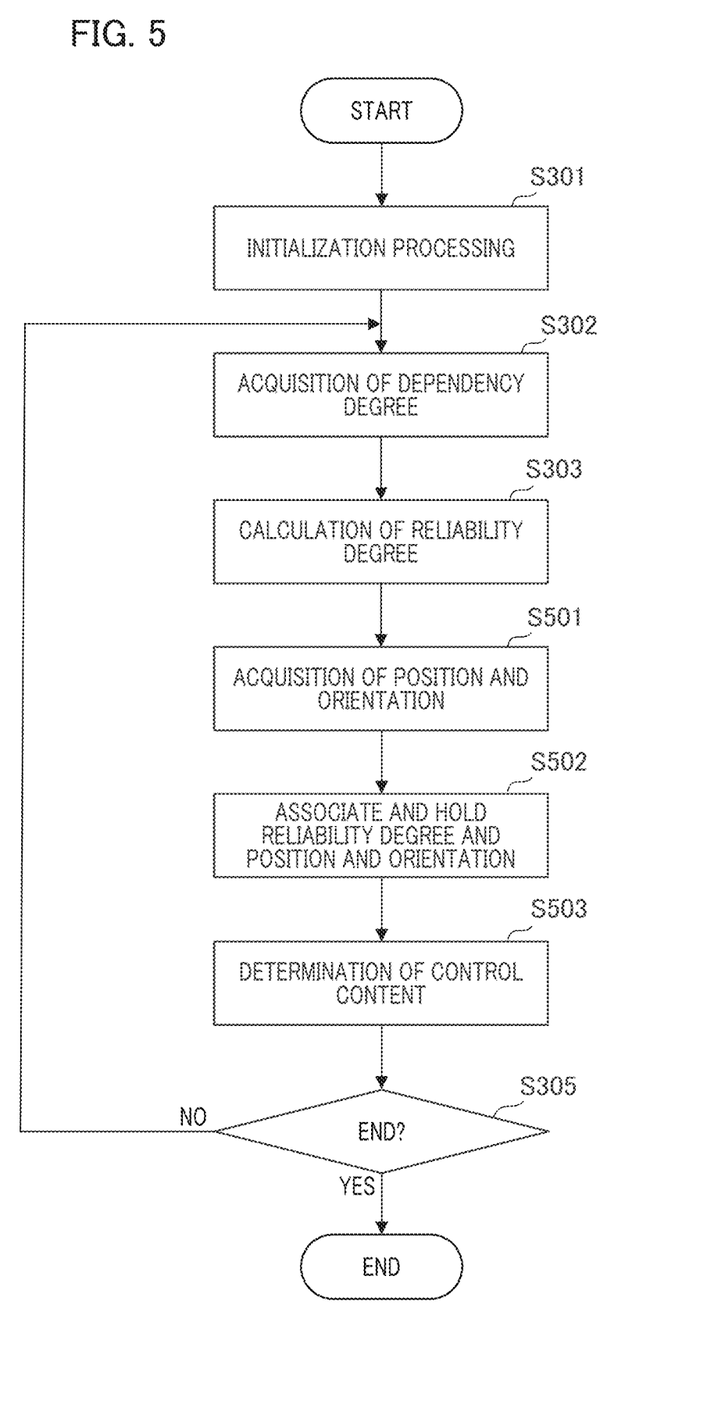
FIG. 5 is a flowchart showing a processing procedure of the information processing apparatus according to the second embodiment.

FIG. 5 is a flowchart showing a processing procedure of the information processing apparatus 110 according to the second embodiment. An explanation with respect to the same steps as in FIG. 3, which is a flowchart showing the processing procedures of the information processing apparatus explained in the first embodiment, will be omitted, and only the steps that differ from those in the first embodiment will be explained. Note that, similar to FIG. 3, in FIG. 5, the processing is performed repeatedly.

In step S301, the reliability degree distribution list is initialized. After initialization, the reliability degree distribution list becomes a state in which the number of elements is zero.

In step S501, the position and orientation acquisition unit 411 acquires a position and orientation from the position and orientation measurement unit 103.

In step S502, the reliability degree distribution holding unit 412 adds the position and orientation acquired in step S501, and the reliability degree calculated based on the dependency degree corresponding to the above described position and orientation in step S303 as a pair to the reliability degree distribution list.

In step S503, the control content determination unit 113 determines the moving content of the moving body system 100 based on the pair of the position and orientation and the reliability degree newly added in step S502, and the reliability degree distribution list held so far. The details of the method of determining moving content will be explained below.

In step S503, in a case in which the newly added reliability degree has become lower than a predetermined value, the control content determination unit 113 determines to change the orientation of the moving body system 100 in a direction that improves the accuracy of the position and orientation measurement that uses the image data. In this context, the direction in which the accuracy of position and orientation measurement that uses image data improves refers to the direction determined based on the position and orientation paired with a reliability degree higher than a predetermined value in the reliability degree distribution list. Specifically, the control content determination unit 113 first acquires from the reliability degree distribution list the pair of position and orientation and the reliability degree newly added by the reliability degree distribution holding unit 412. In a case in which the newly added reliability degree is lower than a predetermined value, in the vicinity of the position of the newly added position and orientation, whether a set of a position and orientation and a reliability degree higher than a predetermined value is present, or a reliability distribution list is searched for. The vicinity of the newly added position is determined by whether or not the difference between the newly added position and other positions referenced in the reliability degree distribution list is within a predetermined distance.

In a case in which a pair of position and orientation with a reliability degree higher than a predetermined value exists in the vicinity of the newly added position, the view frustum of the camera is calculated by turning at each predetermined angle at the newly added position. Then, the orientation of the moving body system 100 is changed so that there is the greatest overlap with the view frustum of the camera at the position and orientation at which the reliability degree is higher than a predetermined value.

In a case in which there are plurality of pairs of position and orientation with a reliability degree higher than a predetermined value in the vicinity of the newly added position, the pair with the least difference from the newly added position and orientation is selected.

In a case in which no pair of position orientation and reliability degree exists in which the reliability degree is higher than a predetermined value in the vicinity of the newly added position, similar to modification example 1-1, the control content determination unit 113 determines to decelerate the traveling of the moving body system 100.

Even in a case in which the reliability degree of the position and orientation measurement has decreased, the method of the present embodiment can improve the reliability degree of the position and orientation measurement by changing the orientation of the moving body, and the moving body can be stably operated.

In the present embodiment, the control content determination unit 113 changes the orientation of the moving body system 100 so that there is the greatest overlap with the view frustum of the camera at the position and orientation at which the reliability degree is higher than a predetermined value, but this is not limited thereto. Any other method may be used, as long as the position and orientation at which the image features detected from the image data at the relevant position and orientation can be calculated. For example, the orientation may be changed so that the group of image feature points in the image data at that position and orientation is included in the view frustum at the newly added position. Alternatively, the orientation may be changed so that the plane through which the view frustum at that position and orientation is cut at a predetermined depth is included in the view frustum at the newly added position.

In the present embodiment, in a case in which the reliability degree has become lower than a predetermined value, the control content determination unit 113 determines to change the orientation of the moving body system 100 in a direction in which the accuracy of position and orientation measurement that uses the image data is improved, but this is not limited thereto.

For example, in a case in which the newly added reliability degree has become lower than a predetermined value, the control content determination unit 113 may determine to change the position of the moving body system 100 to a position at which the accuracy of the position and orientation measurement that uses the image data is improved. In this context, the position at which the accuracy of position and orientation measurement that uses image data is improved refers to the position determined based on the position and orientation that is paired with a reliability degree that is higher than a predetermined value in the reliability degree distribution list. Similar to the change of the orientation, in a case in which the reliability degree distribution list is searched and a pair of a position and orientation and a reliability degree in which the reliability degree higher than a predetermined value exists in the vicinity of the newly added position, the position of the moving body system 100 is changed so that it moves to the corresponding position. Further, not only the position, but also the orientation of the moving body system 100 may be changed so as to approximately correspond to the orientation of the search results.

Further, if the determined control content can be held, from the next time and thereafter, in a case in which the reliability degree has become higher than a predetermined value, the control content determination unit 113 may determine to return the orientation of the moving body system 100 to the orientation before the change.

In step S301 of the present embodiment, the reliability degree distribution list has an initial state in which the number of elements is zero, but this is not limited thereto. For example, the reliability degree distribution holding unit 412 holds the reliability degree distribution list even after the completion of the processing shown in FIG. 5, and if the moving body system 100 travels on the same two-dimensional plane again the next time, other methods may be used. For example, the reliability degree distribution list that was held in the previous processing may be read at the time of initialization and reused.

Third Embodiment

In the present embodiment, an example in which the method of the present invention is applied to movement control of a moving body that conveys a package will be explained. In the second embodiment, a method was shown of improving the reliability degree of position and orientation measurement by holding a reliability distribution that pairs the position and orientation with the reliability degree, and in a state in which the reliability degree of position and orientation measurement has decreased, searching for a neighboring reliability degree distribution and changing the orientation of the moving body towards a direction in which the reliability degree becomes higher.

In the present embodiment, a feature distribution that pairs a position and orientation with an image feature is held, and when the reliability degree of the position and orientation measurement has decreased, a neighboring image feature distribution is searched, and the traveling route of the moving body is changed to a route in which the reliability degree becomes higher. Thereby, a method of improving the reliability degree of position and orientation measurement will be described.

Figure 6:
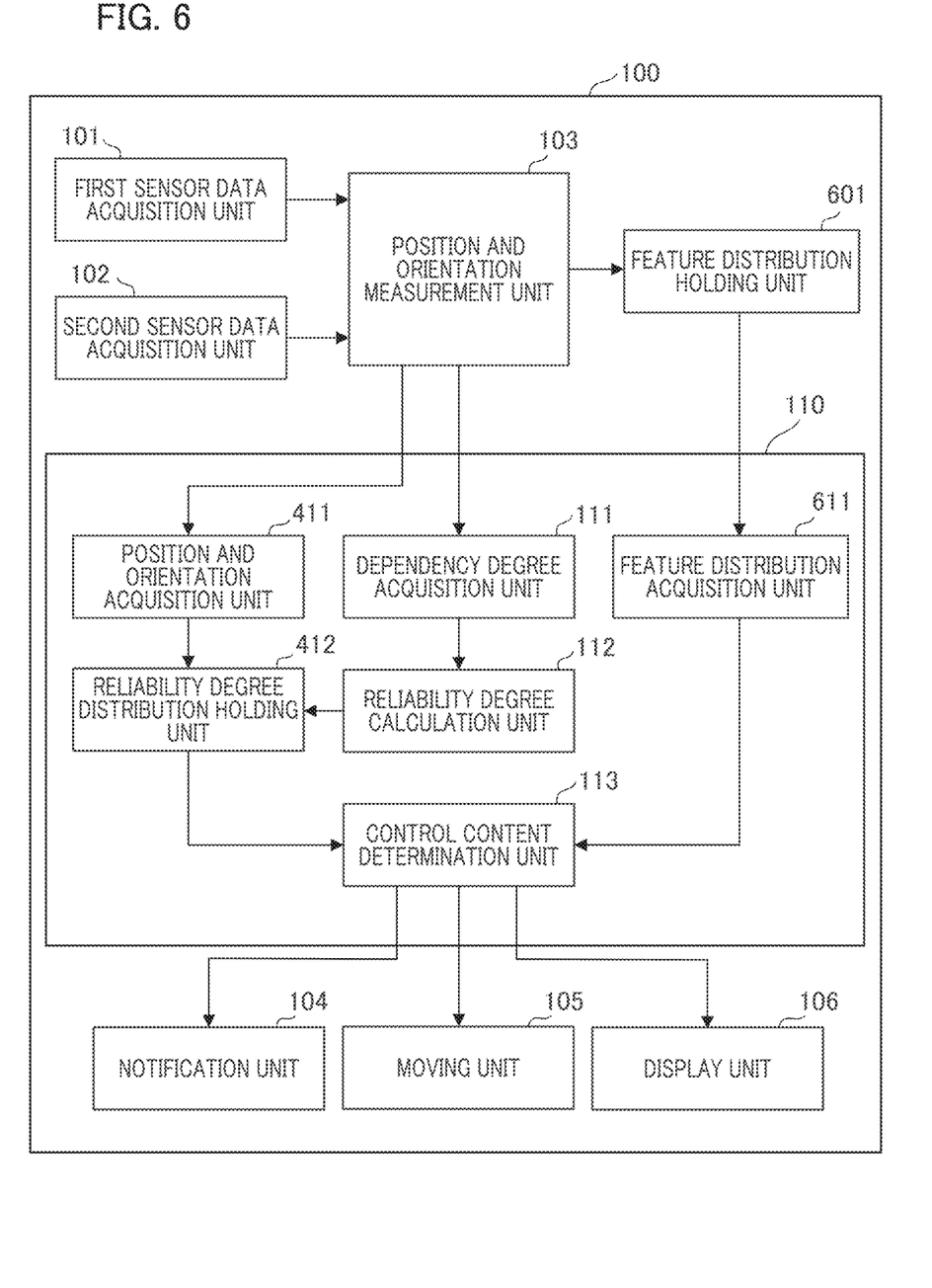
FIG. 6 is a diagram showing an example of a configuration of a moving body system provided with an information processing apparatus according to a third embodiment.

FIG. 6 is a diagram showing an example of a configuration of a moving body system provided with an information processing apparatus 110 in the third embodiment. An explanation will be omitted for the same modules as in FIG. 4, which shows a configuration example of a moving body system provided with the information processing apparatus explained in the second embodiment, and only modules that differ from those of the second embodiment will be explained.

The information processing apparatus 110 includes the dependency degree acquisition unit 111, the reliability degree calculation unit 112, the control content determination unit 113, the position and orientation acquisition unit 411, and the reliability degree distribution holding unit 412. Further, in the present embodiment, the information processing apparatus 110 includes a feature distribution acquisition unit 611.

The feature distribution holding unit 601 acquires from the position and orientation measurement unit 103 a set of three-dimensional positions of image feature points detected at the time of position and orientation measurement that uses image data, which is the first sensor data, and the position and orientation of the image data at the time of image capturing. Then, the feature distribution holding unit 601 holds these as a list configured from pairs of combined position and orientation and a set of three-dimensional positions of image feature points. Hereinafter, the above described list is referred to as a "feature distribution list".

The feature distribution acquisition unit 611 acquires the feature distribution list from the feature distribution holding unit 601.

The control content determination unit 113 determines the moving content related to the moving body system 100 based on the pair of the position and orientation and the reliability degree held by the reliability degree distribution holding unit 412, and the feature distribution list acquired by the feature distribution acquisition unit.

Figure 7:
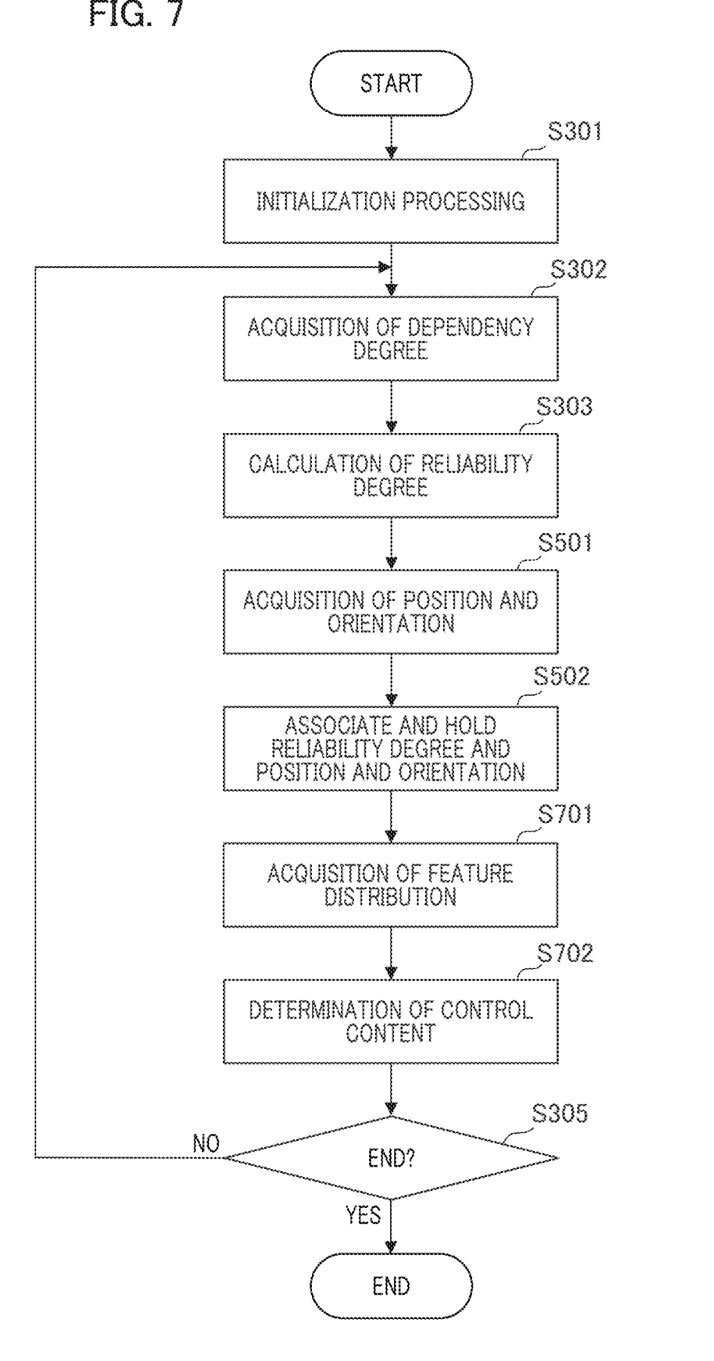
FIG. 7 is a flowchart showing a processing procedure of the information processing apparatus according to the third embodiment.

FIG. 7 is a flowchart showing a processing procedure of the information processing apparatus 110 in the third embodiment. An explanation with respect to the same steps as in FIG. 5, which is a flowchart showing the processing procedures of the information processing apparatus explained in the second embodiment, will be omitted, and only the steps that differ from those in the second embodiment will be explained. Note that, similar to FIG. 5, in FIG. 7, the processing is performed repeatedly.

In step S701, the feature distribution acquisition unit 611 acquires the feature distribution list from the feature distribution holding unit 601.

In step S702, the control content determination unit 113 determines the moving content of the moving body system 100 based on the pair of the position and orientation, and the reliability degree held in step S502, and the feature distribution list acquired in step S701. The details of the method of determining moving content will be explained below.

In step S702, in a case in which the reliability degree has become lower than a predetermined value, the control content determination unit 113 determines to change the route (traveling route) of the moving body system 100 to a route in which the accuracy of the position orientation measurement that uses image data improves.

Specifically, the control content determination unit 113 first acquires the pair of the position and orientation and the reliability degree held by the reliability degree distribution holding unit 412. In a case in which the held reliability degree is lower than a predetermined value, the feature distribution list acquired by the feature distribution acquisition unit 611 is searched for the presence of more than a predetermined number of image feature points in the vicinity of the position in the held position and orientation. The vicinity of the held position is determined by whether or not the difference between the held position and another position referred to in the feature distribution list is within a predetermined distance.

In a case in which there are more pairs of image feature points than a predetermined number in the vicinity of the held position, the traveling route of the moving body system 100 is changed so as to travel over the corresponding position. In a case in which a plurality of pairs of image feature points exists in the vicinity of the current position greater than a predetermined number, the pair of image feature points with the least difference from the current position and orientation is selected. In a case in which no pair of image feature points having a reliability degree greater than a predetermined value exists in the vicinity of the held position, similar to Modification Example 1-1, the control content determination unit 113 determines to decelerate the traveling of the moving body system 100.

According to the method of the present embodiment, even in a case in which the reliability degree of the position and orientation measurement has decreased, the reliability degree of the position and orientation measurement can be improved by changing the route of the moving body, and the moving body can be stably operated.

In the present embodiment, if the control content determination unit 113 can hold the determined control content, from the next time and thereafter, in a case in which the reliability degree has become higher than a predetermined value, it may determine to return the traveling route of the moving body system 100 to the original traveling route.

Further, the control content determination unit 113 determines whether or not the number of image feature points is greater than a predetermined number, but this is not limited thereto, and if there is any indicator that can be used as an indicator of positioning, such an indicator may also be used. For example, a region in which an edge component, a planar component, or a luminance distribution detected from the image data, or a pattern such as a marker draws may be used as an indicator.

In the present embodiment, the feature distribution list has an initial state in which the number of elements is zero, but this is not limited thereto. Any other method may be used, as long as the feature distribution retention unit 601 holds the feature distribution list after the completion of the processing shown in FIG. 7, and the moving body system 100 travels on the same two-dimensional plane again the next time. For example, the feature distribution list that was held in the previous processing may be read and reused.

Fourth Embodiment

In the present embodiment, an example of the application of the method of the present invention to display control in a moving body will be explained. Specifically, the distribution of the calculated reliability degree of the position and orientation measurement is displayed on a screen.

A diagram showing a configuration example of a moving body system provided with the information processing apparatus in the present embodiment is the same as FIG. 4, which shows an example configuration of a moving body system provided with the information processing apparatus explained in the second embodiment.

A flowchart showing the processing procedure of the information processing apparatus 110 in the present embodiment is the same as FIG. 5, which is a flowchart showing the processing procedure of the information processing apparatus 110 explained in the second embodiment. In the following, only the steps that differ from the second embodiment will be explained.

In step S503, the control content determination unit 113 determines that the control content determination unit 113 displays the reliability degree distribution determined from the reliability degree distribution holding list held in step S502. The details of the method of determining display content will be explained below.

In the present embodiment, the control content determination unit 113 determines that a region corresponding to a higher or lower reliability degree is identifiably displayed with respect to the position and orientation and the reliability degree held by the reliability degree distribution holding unit 412.

Figure 8:
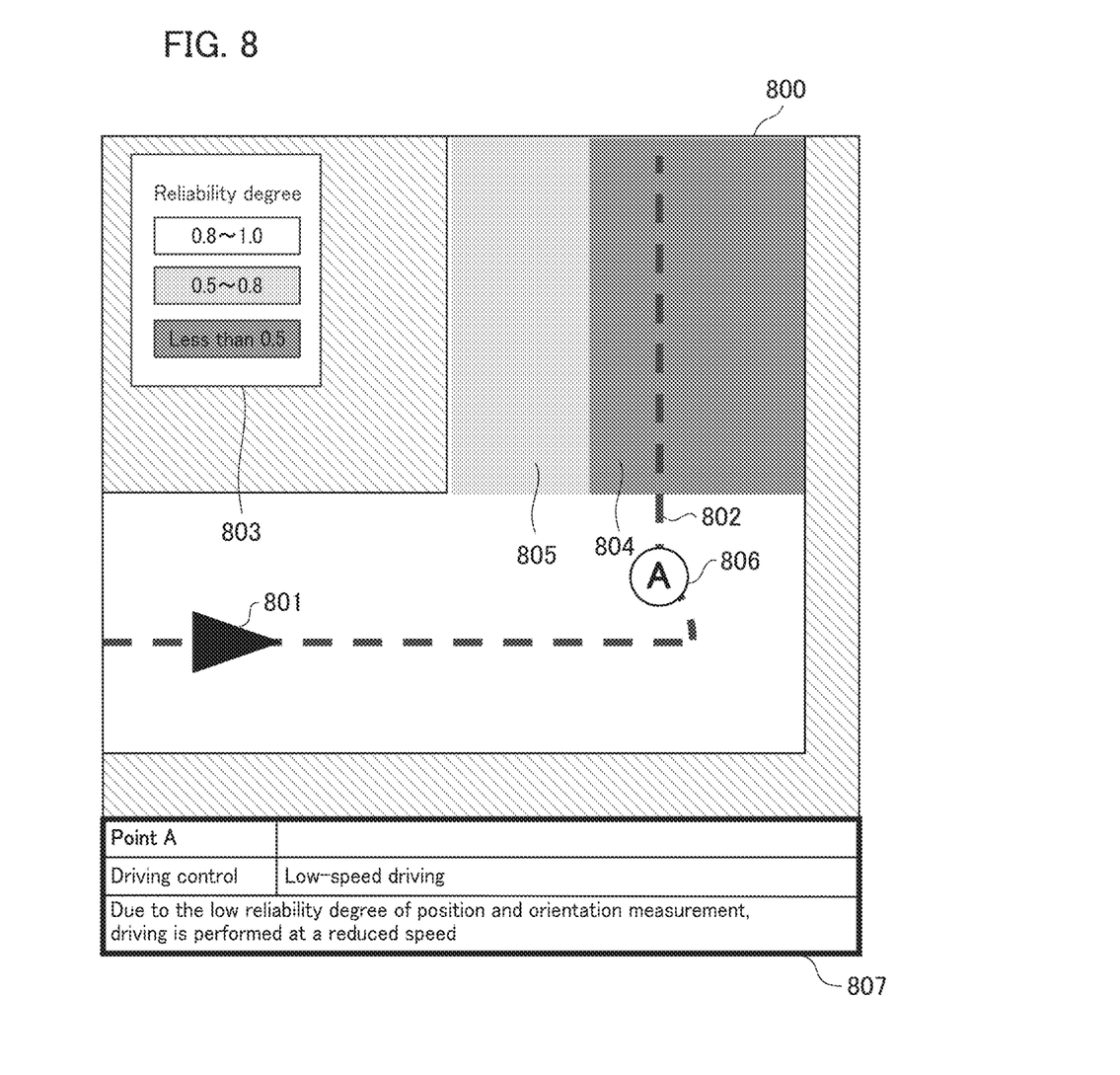
FIG. 8 is a diagram showing a display screen in a fourth embodiment.

FIG. 8 is a diagram showing a display screen in the fourth embodiment. Specifically, an example of a screen displayed on the display portion 16 by the display unit 106 based on the display content determined by the control content determination unit 113 is shown.

The map 800 in FIG. 8 is a map in which the space in which the moving body system 100 travels is represented as a two-dimensional plane. A position 801 is the current position of the moving body system 100. A route 802 is a route along which the moving body system 100 is scheduled to travel. A legend 803 is a legend that shows the reliability degree of the position and orientation measurement in terms of color intensity. In the legend 803, the reliability degree of the spatial area in which the moving body system 100 travels is represented by the intensity of the color. A white region represents a region in which the reliability degree is between 0.8 and 1.0, and in which the reliability degree of the position and orientation measurement is high. A light gray region represents a region in which the reliability degree is between 0.5 and 0.8, and in which the reliability degree of the position and orientation measurement is relatively high. A dark gray region represents a region in which the reliability degree is less than 0.5, and in which the reliability degree of the position and orientation measurement is low. In FIG. 8, a region 804 is a region in which the reliability degree is less than 0.5 and the reliability degree of the position and orientation measurement is low. A region 805 is a region in which the reliability degree is between 0.5 and 0.8, and in which the reliability degree of the position and orientation measurement is relatively high.

According to the method of the present embodiment, the high or low reliability degree of the position and orientation measurement for each region is made visible and displayed to the user. Thereby, the user is urged to change the traveling control of the moving body system 100, and the moving body can be stably operated as a result.

The control content determination unit 113 may display the moving content determined based on the position and orientation and the reliability degree. For example, point 806 in FIG. 8 is a point that reflects the movement content determined based on the position and orientation and the reliability degree. An explanation 807 of FIG. 8 is an explanation of the moving content determined based on the position and orientation, and the reliability degree.

In addition, the control content determination unit 113 may determine to display the reliability degree for each direction at a predetermined position based on the position and orientation and the reliability degree so that the change of the position and orientation of the moving body system 100 can be determined.

According to the method of the fourth embodiment, the high or low reliability degree of the position and orientation measurement for each region is made visible and displayed to the user. Thereby, the user is urged to change the traveling control of the moving body system 100, and the moving body can be stably operated as a result.

Above, the present invention has been explained based on the preferred embodiments. However, the present invention is not limited to these specified embodiments, and various embodiments that are not outside of the gist of this invention are included in the present invention. In addition, parts of the embodiments explain3d above may be suitably combined.

In the embodiment described above, the moving body moves on a two-dimensional plane, but this is not limited thereto. For example, the moving body may move in a three-dimensional space, such as a drone. In this case, the position and orientation are six parameters that combine three parameters (X, Y, Z) that represent the position in a three-dimensional space, and three parameters (roll, pitch, yaw) that represent the orientation in a three-dimensional space.

The present invention can be realized by supplying a program that realizes one or more functions of the above embodiments to a system or apparatus via a network or memory medium, and one or more processors in a computer of a system or apparatus can realize processes that read out and execute a program. In addition, this may also be realized by a circuit (for example ASIC) that realizes one or more function.

According to the present invention, a moving body can be stably operated.

Other Embodiments

Embodiments of the present invention can also be realized by a computer of a system or apparatus that reads out and executes computer executable instructions (for example, one or more programs) recorded on a storage medium (which may also be referred to more fully as anon-transitory computer-readable storage medium') to perform the functions of one or more of the above-described embodiments and/or that includes one or more circuits (for example, application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (for example, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-167386, filed Oct. 12 2021, which is hereby incorporated by reference herein in its entirety.

What is claimed is:

1. An information processing apparatus comprising:
at least one processor and memory holding a program which makes the processor function as:
a measurement unit configured to carry out position and orientation measurement of at least one of a position and an orientation of the moving body based on first sensor data and second sensor data stored in a moving body,
a control content determination unit configured to determine a control content of the moving body based on at least one of a position and an orientation measured by the measurement unit,
a dependency degree acquisition unit configured to acquire a dependency degree of the second sensor data with respect to the first sensor data in a measurement by the measurement unit, and
a reliability degree calculation unit configured to calculate a reliability degree that represents a smallness of an accumulation value of the dependency degree,
wherein the control content determination unit is configured to determine a control content of the moving body based on the reliability degree that has been calculated by the reliability degree calculation unit.

2. The information processing apparatus according to claim 1, wherein the control content determination unit is configured to determine the control content so that the reliability degree that has been calculated by the reliability degree calculation unit becomes higher.

3. The information processing apparatus according to claim 1, wherein the reliability degree calculation unit is configured to calculate the reliability degree so that the larger the accumulated value of the dependency degree becomes, the lower the reliability degree becomes.

4. The information processing apparatus according to claim 1, wherein the reliability degree calculation unit is configured to calculate the reliability degree so that as the time in a state in which the dependency degree exceeds a predetermined value continues becomes greater, the lower the reliability degree becomes.

5. The information processing apparatus according to claim 1, wherein the reliability degree calculation unit is configured to calculate the reliability degree so that as the distance traveled in a state in which the dependency degree exceeds a predetermined value continues becomes greater, the lower the reliability degree becomes.

6. The information processing apparatus according to claim 1, further configured to include a notification unit that is configured to notify a user that the reliability degree of a measurement by the measurement unit has decreased.

7. The information processing apparatus according to claim 1, wherein, based on the reliability degree, the control content determination unit is further configured to determine at least one of the progression of the moving body, the speed of the moving body, the orientation of the moving body, and the route of the moving body.

8. The information processing apparatus according to claim 1, wherein, based on the reliability degree, the control content determination unit is further configured to determine a reliability distribution capable of identifying a magnitude of the reliability degree.

9. The information processing apparatus according to claim 8, configured to further include
a reliability degree distribution holding unit that is configured to hold the reliability degree distribution that associates the reliability degree calculated by the reliability degree calculation unit with at least one of the position and orientation measured by the measurement unit,
wherein the control content determination unit is configured to determine the control content so as to improve the accuracy of a position and orientation measurement by the first sensor data based on a relationship between the reliability degree of the reliability degree distribution held by the reliability degree distribution holding unit and at least one of the position and the orientation.

10. The information processing apparatus according to claim 9, wherein the control content determination unit is further configured to determine a control content so as to change a route of the moving body to a route that improves the accuracy of a position and orientation measurement with respect to the first sensor data based on the distribution of the reliability degree held by the reliability degree distribution holding unit.

11. The information processing apparatus according to claim 9, wherein the control content determination unit is further configured to determine the control content so as to display the distribution of the reliability degree held by the reliability degree distribution holding unit.

12. The information processing apparatus according to claim 1, wherein the dependency degree acquisition unit is configured to acquire a dependency degree that is calculated based on the accuracy of a position and orientation measurement by using the first sensor data.

13. The information processing apparatus according to claim 12, wherein the first sensor data is image data that has been captured by an image capturing apparatus that is mounted on the moving body, and wherein the measurement unit is configured to perform measurement of at least one of a position and an orientation based on the number of feature points in the image data, and to determine the accuracy of a position and orientation measurement by the first sensor data based on the number of feature points in the image data.

14. The information processing apparatus according to claim 13, wherein the second sensor data is inertial measurement data measured by an inertial measurement device that is mounted on the moving body.

15. The information processing apparatus according to claim 1, wherein based on the reliability degree, the control content determination unit is further configured to determine at least one of the progression of the moving body, the speed of the moving body, the orientation of the moving body, and the route of the moving body.

16. A control method of an information processing apparatus, the method comprising:

a measurement step of measuring at least one of a position and an orientation of a moving body based on a first sensor data and a second sensor data stored in the moving body, a control content determination step of determining a control content of the moving body based on at least one of a position and an orientation measured by the measurement step, a dependency degree acquisition step of acquiring a dependency degree of the second sensor data with respect to the first sensor data in the measurement by the measurement step, and a reliability degree calculation step of calculating a reliability degree that represents a smallness of an accumulated value of the dependency degree, wherein the control content determination step determines a control content of the moving body based on the reliability degree calculated by the reliability degree calculation step.

17. A non-transitory computer-readable storage medium configured to store a computer program for an image processing apparatus to execute the following steps:

a measurement step of measuring at least one of a position and an orientation of a moving body based on a first sensor data and a second sensor data stored in the moving body, a control content determination step of determining a control content of the moving body based on at least one of a position and an orientation measured by the measurement step, a dependence degree acquiring step that acquires the dependency degree of the first sensor data and the second sensor data in the measurement by the measurement step, and a reliability degree calculation step of calculating a reliability degree that represents a smallness of an accumulated value of the dependency degree, wherein the control content determination step determines a control content of the moving body based on the reliability degree calculated by the reliability degree calculation step.

* * * * *